United States Patent Office 2,942,031
Patented June 21, 1960

2,942,031
3,3-DICHLORO-2-METHYLACROLEINS

Donald G. Kundiger and Gene F. Morris, Manhattan, Kans., and Clarence R. Dick, Lake Jackson, Tex., assignors to The Dow Chemical Company, Midland, Mich., a corporation of Delaware No Drawing. Filed Oct. 6, 1958, Ser. No. 765,311

2 Claims. (Cl. 260—601)

This invention is related to 3,3-dichloro-2-alkylacroleins represented by the formula

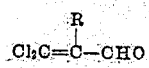
$$Cl_2C=C-CHO$$ (with R above C)

In this and succeeding formulae, R represents a lower alkyl radical containing from 1 to 4 carbon atoms, inclusive, such as methyl, ethyl, propyl or butyl. More specifically the invention is concerned with new methods for preparing 3,3-dichloro-2-alkylacroleins and embraces new compounds prepared in accordance with this invention, particularly 3,3-dichloro-2-methylacrolein.

The 3,3-dichloro-2-alkylacroleins are yellow liquids, soluble in acetone, alcohol, xylene, and petroleum hydrocarbons and substantially insoluble in water and aqueous alkali.

The 3,3-dichloro-2-alkylacroleins are useful as parasiticides for the control of aphids, nematodes, bacteria and fungi. They are also useful as herbicides for the control of germinant seeds and seedlings.

According to this invention, 3,3-dichloro-2-alkylacroleins may be prepared by the direct oxidation of 3,3-dichloro-2-alkylallyl alcohol having the structure

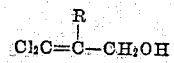
$$Cl_2C=C-CH_2OH$$ (with R above C)

with an oxidizing agent selected from (1) a chromic oxide agent and (2) nitric acid. By "chromic oxide agent" is meant an oxidizing mixture of ammonium, sodium or potassium dichromate and concentrated sulfuric acid. When chromic oxide agent is employed as oxidizing agent, the bis(3,3-dichloro-2-alkylallyl)acetal of 3,3-dichloro-2-alkylacrolein is obtained as by-product.

One method for the preparation of 3,3-dichloro-2-alkylacrolein is by oxidizing the corresponding 3,3-dichloro-2-alkylallyl alcohol with a chromic oxide agent. Good results are obtained when an equivalent proportion or a slight excess of the chromic oxide agent is employed, based on the allyl alcohol. The reaction takes place in the temperature range of from about 40° C. to 150° C. at a pressure of from 20 to 760 millimeters of mercury. The preferred range is from about 40° C. to 80° C. at a pressure of from about 10 to 30 millimeters of mercury. The reaction is preferably carried out in such a manner that a major part of the desired acrolein product and acetal by-product codistills with water from the reaction mixture substantially as soon as it is formed. The time usually required to complete the reaction is generally from 1 to 3 hours but may vary depending upon the scale in which the reaction is carried out. After completion of the reaction any remaining product is distilled from the reaction mixture.

In a preferred method for carrying out the reaction, an aqueous solution of a chromic oxide agent is added portionwise to 3,3-dichloro-2-alkylallyl alcohol in the temperature range of from 40° C. to 80° C. at about 10 to 30 millimeters of mercury pressure while simultaneously distilling off the 3,3-dichloro-2-alkylacrolein product, the acetal by-product and water. Heating is continued until the distillation of the organic material is substantially complete. The organic material in the distillate is then separated from the water by conventional procedures and then fractionally distilled to obtain the desired 3,3-dichloro-2-alkylacrolein product.

In an alternative method for preparing 3,3-dichloro-2-alkylacrolein, the corresponding 3,3-dichloro-2-alkylallyl alcohol is oxidized with concentrated nitric acid. Good results are obtained when a molar excess of the concentrated nitric acid is employed for each molar proportion of the alcohol. The reaction takes place in the temperature range of from about —5° C. to 30° C. It is desirable to carry out the reaction at an initial temperature in the range of from —5° C. to 10° C. to moderate the vigor of the reaction and to subsequently increase the temperature to a maximum of about 30° C. The reaction is generally complete in from one to three hours after the reactants are mixed together.

In carrying out the reaction by the second procedure, the appropriate 3,3-dichloro-2-alkylallyl alcohol is added portionwise to aqueous concentrated nitric acid maintained in the temperature range of from about —5° C. to about 10° C. A reaction takes place during the addition with the evolution of nitrogen oxide and nitrogen dioxide gases. After completion of the addition, the reaction mixture may be allowed to warm gradually to about 25° to 30° C. Thereafter, the nitrogen oxide gases still remaining in the reaction mixture are removed by any one or a combination of the following procedures: (1) alternately cooling and warming between the temperatures of about 12° C. and 30° C., (2) subjecting the reaction mixture to a reduced pressure of from 10 to 20 millimeters of mercury, or (3) bubbling nitrogen gas through the reaction mixture. After the removal of the nitrogen oxide gases is substantially complete, the reaction mixture is treated with an alkali metal bicarbonate solution to render the reaction mixture substantially neutral. The organic portion is separated from the aqueous portion according to conventional procedures. The organic portion is then fractionally distilled to obtain the desired 3,3-dichloro-2-alkylacrolein.

The following examples illustrate the invention but are not to be construed as limiting.

EXAMPLE 1

*3,3-dichloro-2-methylacrolein*

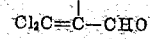
$$Cl_2C=C-CHO$$ (with CH_3 above C)

A solution of 84 grams (0.35 mole) of ammonium dichromate and 134 grams (1.35 moles) of concentrated sulfuric acid in 400 milliliters of water was added with stirring to 141 grams (1.0 mole) of 3,3-dichloro-2-methylallyl alcohol preheated to a temperature of 57° C. and at a pressure of 30 millimeters of mercury. A reaction took place as the addition proceeded with the formation of the 3,3-dichloro-2-methylacrolein product and the by-product, bis(3,3-dichloro-2-methylallyl)acetal of 3,3-dichloro-2-methylacrolein which codistilled with water out of the reaction mixture. After completion of the addition, the reaction mixture was heated to 80° C. to distill the remainder of the products. The organic portion of the distillate was mechanically separated from the water layer, and the water layer extracted with carbon tetrachloride. The carbon tetrachloride extract and organic portion were combined and dried with magnesium sulfate. The dried organic material was fractionally distilled to obtain 74.8 grams (54 percent yield) of a 3,3-dichloro-2-methylacrolein product boiling at 65° C. to 66° C. at 50 millimeters of mercury pressure and having a refractive index $n_D^{20}$ of 1.504. The product had elemental analyses as follows:

|  | C | H | Cl |
|---|---|---|---|
| Calculated | 34.54 | 2.88 | 51.01 |
| Found | 34.00 | 2.93 | 50.51 |

EXAMPLE 2

A solution of 105 grams (0.35 mole) of potassium dichromate and 134 grams (1.35 mole) of concentrated sulfuric acid in 400 milliliters of water was added dropwise with stirring over a period of 2.5 hours to 141 grams (1.0 mole) of 3,3-dichloro-2-methylallyl alcohol maintained at a temperature of about 140° C. A reaction took place as the addition proceeded with the formation of a 3,3-dichloro-2-methylacrolein product and acetal byproduct which codistilled with the water out of the reaction mixture. The organic material was separated from the distillate as described in Example 1, and thereafter fractionally distilled to obtain 53 grams (41 percent yield) of a 3,3-dichloro-2-methylacrolein product boiling at 61°–62° C. at 31 millimeters of mercury pressure and having a refractive index, $n_D^{20}$ of 1.504.

EXAMPLE 3

141 grams (1.0 mole) of 3,3-dichloro-2-methylallyl alcohol was added portionwise to 130 milliliters (2.0 moles) of aqueous 70 percent nitric acid (specific gravity, 1.42). The nitric acid solution was cooled to −3° C. prior to the addition and the reaction mixture maintained in the temperature range of between −3° and +2° C. during the addition of about 90 percent of the 3,3-dichloro-2-methylallyl alcohol. An exothermic reaction took place during the addition with the evolution of byproduct nitrogen oxide and nitrogen dioxide gases. Thereafter, the reaction mixture was allowed to warm to about 14° C. over a period of 1 hour. There was continued evolution of the nitrogen oxide gases. The mixture was then cooled to 5° C. and the remaining alcohol added portionwise over a period of about one hour while the temperature was maintained between 0° and 5° C. After completion of the addition, the mixture was subjected successively to (1) alternate warming and cooling between 25° C. and 15° C., (2) normal water pump vacuum pressure at room temperature, and (3) passage of nitrogen gas entraining agent therethrough at 50° C. to remove the nitrogen oxide gases. Following this, the mixture was treated with sodium bicarbonate to assure neutralization of the reaction mixture, and the organic and aqueous portions then separated. The organic portion was washed with sodium bicarbonate and then fractionally distilled to obtain a 3,3-dichloro-2-methylacrolein product boiling at 45.5°–46.5° C. at 20 millimeters pressure and having a refractive index, $n_D^{20}$ of 1.505. The yield of the product was 85.6 grams or 61 percent of theoretical.

EXAMPLE 4

In a manner similar to that described in Example 3, 3,3-dichloro-2-ethylacrolein, 3,3-dichloro-2-propylacrolein and 3,3-dichloro-2-butylacrolein may be obtained by the nitric acid oxidation of 3,3-dichloro-2-ethylallyl alcohol, 3,3-dichloro-2-propylallyl alcohol and 3,3-dichloro-2-butylallyl alcohol, respectively.

EXAMPLE 5

In operations similar to that described in Example 1 or Example 2, the 3,3-dichloro-2-alkylacroleins of Example 3 may be obtained from the corresponding 3,3-dichloro-2-alkylallyl alcohols by oxidation with a chromic oxide agent.

The 3,3-dichloro-2-alkylacrolein compounds of the present invention are useful as parasiticides and as herbicides. In a representative operation of their use as herbicide complete control of the germination of canary grass seeds (*Phalaris canariensis*) was obtained when an aqueous dispersion containing 100 parts by weight of the 3,3-dichloro-2-methylacrolein product per million parts by weight of dispersion was applied to seed beds containing canary grass seeds.

In a representative operation of their use as parasiticide, 3,3-dichloro-2-methylacrolein was dispersed in yeast agar medium to produce a medium containing 0.1 percent by weight of the acrolein compound. The medium was plated on Petri dishes, the surfaces of the dishes streaked with *Aspergillus terreus, Penecillum digitatum* and *Rhizopus nigricans* and thereafter incubated at 30° C. for 3 days. It was found that there was complete inhibition of growth of each of the test organisms.

The 3,3-dichloro-2-alkylallyl alcohol employed as starting materials may be prepared by the alkaline hydrolysis of 1,1,3-trichloro-2-alkyl-1-propene. The preparation may be carried out by heating together in excess water, equimolar proportions of 1,1,3-trichloro-2-alkyl-1-propene and sodium hydroxide with stirring until the solution is neutral to litmus. After completion of the heating, the organic and aqueous layers may be separated and the organic layer fractionally distilled to obtain the 3,3-dichloro-2-alkylallyl alcohol.

The 1,1,3-trichloro-2-alkyl-1-propene may be prepared by the rearrangement of 1,1,1-trichloro-2-alkyl-2-propene in the presence of a catalyst such as thionyl chloride.

We claim:
1. A method for preparing a 3,3-dichloro-2-alkylacrolein having the formula

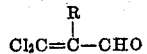

wherein R represents a lower alkyl radical containing from 1 to 4 carbon atoms, inclusive, which comprises intimately mixing an allyl alcohol having the formula

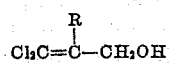

wherein R is as above defined with excess nitric acid in the temperature range of from about −10° C. to 30° C.

2. 3,3-dichloro-2-methylacrolein having the formula

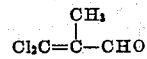

References Cited in the file of this patent

UNITED STATES PATENTS 2,339,282    McNamee et al. _____ Jan. 18, 1944

OTHER REFERENCES

Wagner et al.: Synthetic Organic Chemistry (1953), p. 289.

Royals: Advanced Organic Chemistry (1956), p. 564.